(12) United States Patent
Mukherjee et al.

(10) Patent No.: US 12,093,707 B2
(45) Date of Patent: *Sep. 17, 2024

(54) ACTION RECIPES FOR A CROWDSOURCED DIGITAL ASSISTANT SYSTEM

(71) Applicant: PELOTON INTERACTIVE INC., New York, NY (US)

(72) Inventors: Rajat Mukherjee, New York, NY (US); Mark Robinson, New York, NY (US); Kiran Bindhu Hemaraj, New York, NY (US)

(73) Assignee: PELOTON INTERACTIVE INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,957

(22) Filed: May 23, 2022

(65) Prior Publication Data

US 2022/0283831 A1 Sep. 8, 2022

Related U.S. Application Data

(63) Continuation of application No. 15/936,001, filed on Mar. 26, 2018, now Pat. No. 11,340,925.

(Continued)

(51) Int. Cl.
| | | |
|---|---|---|
| G06F 3/00 | (2006.01) | |
| G06F 9/455 | (2018.01) | |
| G06F 9/54 | (2006.01) | |

(52) U.S. Cl.
CPC .......... *G06F 9/45512* (2013.01); *G06F 9/541* (2013.01)

(58) Field of Classification Search
CPC ....................................................... G06F 9/54

(Continued)

(56) References Cited

U.S. PATENT DOCUMENTS 5,600,711 A * 2/1997 Yuen ............... H04M 11/007
379/102.03
6,173,266 B1 1/2001 Marx et al.
(Continued)

FOREIGN PATENT DOCUMENTS

| EP | 2386975 A2 | 11/2011 |
|---|---|---|
| EP | 2760015 A1 | 7/2014 |
| WO | 2016109366 A1 | 7/2016 |

OTHER PUBLICATIONS

Petros Alexandridis, A Wireless PDA-based Acoustics Measurement Platform. (Year: 2007).*

(Continued)

*Primary Examiner* — Lechi Truong
(74) *Attorney, Agent, or Firm* — AMPACC Law Group, PLLC

(57) ABSTRACT

Embodiments of the present invention are directed to action recipes for a crowdsourced digital assistant. Users can define an action recipe by recording a set of inputs across one or more applications, by providing multiple sub-commands in a single on-the-fly command, by providing one or more associated commands, or otherwise. An action recipe dataset is generated, and stored and indexed on a user device and/or on an action cloud server. As such, any user can invoke an action recipe by providing an associated command to a crowdsourced digital assistant application on a user device. The crowdsourced digital assistant searches for a matching command on the user device and/or the action cloud server, and if a match is located, the corresponding action recipe dataset is accessed, and the crowdsourced digital assistant emulates the actions in the action recipe on the user device.

14 Claims, 8 Drawing Sheets

Related U.S. Application Data

(60) Provisional application No. 62/613,165, filed on Jan. 3, 2018, provisional application No. 62/576,804, filed on Oct. 25, 2017, provisional application No. 62/576,766, filed on Oct. 25, 2017, provisional application No. 62/539,866, filed on Aug. 1, 2017, provisional application No. 62/509,534, filed on May 22, 2017, provisional application No. 62/508,181, filed on May 18, 2017.

(58) Field of Classification Search
USPC .......................................................... 719/310
See application file for complete search history.

(56) References Cited

U.S. PATENT DOCUMENTS

| | | | |
|---|---|---|---|
| 6,188,976 B1 | 2/2001 | Ramaswamy et al. | |
| 6,442,519 B1 | 8/2002 | Kanevsky et al. | |
| 6,535,912 B1 | 3/2003 | Anupam et al. | |
| 6,636,831 B1 | 10/2003 | Profit et al. | |
| 6,678,864 B1 | 1/2004 | Tsai | |
| 7,024,348 B1 | 4/2006 | Scholz et al. | |
| 7,440,895 B1 | 10/2008 | Miller et al. | |
| 7,546,576 B2 | 6/2009 | Egli | |
| 7,627,638 B1 | 12/2009 | Cohen | |
| 7,729,919 B2 | 6/2010 | Wang | |
| 7,747,573 B2 | 6/2010 | Butt et al. | |
| 7,756,708 B2 | 7/2010 | Cohen et al. | |
| 8,160,883 B2 | 4/2012 | Lecoeuche | |
| 8,453,058 B1 | 5/2013 | Coccaro et al. | |
| 8,473,949 B2 | 6/2013 | Horvitz et al. | |
| 8,508,401 B1* | 8/2013 | Patel | H04L 12/282 341/176 |
| 8,620,842 B1 | 12/2013 | Cormack | |
| 8,775,177 B1 | 7/2014 | Heigold et al. | |
| 8,805,766 B2 | 8/2014 | Ray | |
| 9,053,708 B2 | 6/2015 | Koch et al. | |
| 9,123,336 B1 | 9/2015 | Uszkoreit et al. | |
| 9,330,659 B2 | 5/2016 | Ju et al. | |
| 9,384,732 B2 | 7/2016 | Bishop et al. | |
| 9,412,392 B2 | 8/2016 | Lindahl | |
| 9,472,192 B2 | 10/2016 | Ding | |
| 9,479,831 B2 | 10/2016 | Oostveen et al. | |
| 9,619,468 B2 | 4/2017 | Adams et al. | |
| 9,620,122 B2 | 4/2017 | Vanblon | |
| 9,754,585 B2 | 9/2017 | Brockett et al. | |
| 10,007,500 B1* | 6/2018 | Suraci | G06F 8/61 |
| 10,209,956 B2 | 2/2019 | Fletcher et al. | |
| 10,217,462 B2 | 2/2019 | Sarikaya et al. | |
| 10,466,963 B2 | 11/2019 | Levi et al. | |
| 10,489,405 B2 | 11/2019 | Zheng et al. | |
| 10,528,605 B2 | 1/2020 | Braga et al. | |
| 2002/0032564 A1 | 3/2002 | Ehsani et al. | |
| 2003/0212561 A1 | 11/2003 | Williams et al. | |
| 2004/0236580 A1 | 11/2004 | Bennett | |
| 2005/0010418 A1 | 1/2005 | McNair et al. | |
| 2005/0010892 A1 | 1/2005 | McNair et al. | |
| 2005/0135338 A1 | 6/2005 | Chiu et al. | |
| 2005/0240917 A1 | 10/2005 | Wu | |
| 2005/0261903 A1 | 11/2005 | Kawazoe et al. | |
| 2006/0294509 A1 | 12/2006 | Mital et al. | |
| 2007/0055492 A1 | 3/2007 | Wang et al. | |
| 2007/0271292 A1 | 9/2007 | Acharya et al. | |
| 2008/0021708 A1 | 1/2008 | Bennett et al. | |
| 2008/0120616 A1 | 5/2008 | James et al. | |
| 2008/0201140 A1 | 8/2008 | Wells et al. | |
| 2009/0070312 A1 | 3/2009 | Patterson | |
| 2009/0094552 A1* | 4/2009 | Watson | G06F 9/451 715/804 |
| 2009/0249206 A1 | 10/2009 | Stahlberg | |
| 2009/0307162 A1 | 12/2009 | Bui et al. | |
| 2010/0036676 A1 | 2/2010 | Safdi et al. | |
| 2010/0082398 A1 | 4/2010 | Davis et al. | |
| 2010/0088100 A1 | 4/2010 | Lindahl | |
| 2011/0066634 A1 | 3/2011 | Phillips et al. | |
| 2011/0301943 A1 | 12/2011 | Patch | |
| 2011/0320767 A1 | 12/2011 | Eren et al. | |
| 2012/0035932 A1 | 2/2012 | Jitkoff et al. | |
| 2012/0066600 A1 | 3/2012 | Nickel | |
| 2012/0072951 A1* | 3/2012 | King | G06F 3/0482 725/37 |
| 2012/0209613 A1 | 8/2012 | Agapi et al. | |
| 2013/0013644 A1 | 1/2013 | Sathish et al. | |
| 2013/0080177 A1 | 3/2013 | Chen | |
| 2013/0152092 A1 | 6/2013 | Yadgar et al. | |
| 2013/0179423 A1 | 7/2013 | Gur et al. | |
| 2013/0329086 A1 | 12/2013 | Malone | |
| 2014/0074483 A1 | 3/2014 | Van Os | |
| 2014/0108013 A1 | 4/2014 | Di Cristo et al. | |
| 2014/0115456 A1 | 4/2014 | White et al. | |
| 2014/0136187 A1 | 5/2014 | Wolverton et al. | |
| 2014/0222436 A1 | 8/2014 | Binder et al. | |
| 2014/0278413 A1 | 9/2014 | Pitschel et al. | |
| 2014/0278419 A1 | 9/2014 | Bishop et al. | |
| 2014/0282003 A1 | 9/2014 | Gruber et al. | |
| 2014/0297282 A1 | 10/2014 | Peters et al. | |
| 2015/0006178 A1 | 1/2015 | Peng et al. | |
| 2015/0032451 A1 | 1/2015 | Gunn et al. | |
| 2015/0089373 A1 | 3/2015 | Dwivedi et al. | |
| 2015/0095031 A1 | 4/2015 | Conkie et al. | |
| 2015/0120723 A1 | 4/2015 | Deshmukh et al. | |
| 2015/0172262 A1 | 6/2015 | Ortiz, Jr. et al. | |
| 2015/0180967 A1 | 6/2015 | Takagishi | |
| 2015/0242385 A1 | 8/2015 | Bao et al. | |
| 2015/0248730 A1 | 9/2015 | Pilot et al. | |
| 2015/0279368 A1* | 10/2015 | Contolini | A61B 1/0004 704/246 |
| 2015/0302850 A1 | 10/2015 | Lebrun | |
| 2015/0317310 A1 | 11/2015 | Glass et al. | |
| 2015/0348551 A1 | 12/2015 | Gruber et al. | |
| 2015/0355609 A1 | 12/2015 | Warren | |
| 2015/0371628 A1 | 12/2015 | Kreifeldt | |
| 2015/0373183 A1 | 12/2015 | Woolsey et al. | |
| 2016/0004974 A1 | 1/2016 | Pope | |
| 2016/0019266 A1 | 1/2016 | Katsunuma et al. | |
| 2016/0077853 A1 | 3/2016 | Feng et al. | |
| 2016/0132568 A1 | 5/2016 | Vogel et al. | |
| 2016/0162456 A1 | 6/2016 | Munro et al. | |
| 2016/0171980 A1* | 6/2016 | Liddell | G10L 15/22 704/275 |
| 2016/0225369 A1* | 8/2016 | Agrawal | G10L 25/48 |
| 2016/0225370 A1 | 8/2016 | Kannan et al. | |
| 2016/0225371 A1 | 8/2016 | Agrawal et al. | |
| 2016/0259623 A1 | 9/2016 | Sumner et al. | |
| 2016/0259717 A1* | 9/2016 | Nychis | G06F 9/455 |
| 2016/0260430 A1 | 9/2016 | Panemangalore et al. | |
| 2016/0275949 A1 | 9/2016 | Bishop et al. | |
| 2016/0358603 A1 | 12/2016 | Azam et al. | |
| 2016/0378279 A1 | 12/2016 | Sirpal et al. | |
| 2016/0378325 A1 | 12/2016 | Hurley et al. | |
| 2016/0378439 A1 | 12/2016 | Straub et al. | |
| 2017/0011739 A1 | 1/2017 | Huang | |
| 2017/0116982 A1 | 4/2017 | Gelfenbeyn et al. | |
| 2017/0193123 A1 | 7/2017 | Jones et al. | |
| 2017/0220240 A1 | 8/2017 | Kataria et al. | |
| 2018/0174577 A1 | 6/2018 | Jothilingam et al. | |
| 2018/0308476 A1 | 10/2018 | Hirzel et al. | |
| 2018/0336049 A1* | 11/2018 | Mukherjee | G06F 8/61 |
| 2018/0336885 A1 | 11/2018 | Mukherjee et al. | |
| 2018/0350353 A1 | 12/2018 | Gruber et al. | |
| 2018/0366108 A1 | 12/2018 | Mukherjee et al. | |
| 2018/0366113 A1 | 12/2018 | Hemaraj et al. | |
| 2019/0205325 A1* | 7/2019 | Dobrynin | G06F 16/3344 |
| 2019/0208130 A1 | 7/2019 | Hara et al. | |
| 2019/0235887 A1* | 8/2019 | Hemaraj | G06F 3/167 |
| 2019/0236459 A1* | 8/2019 | Cheyer | G06F 9/542 |
| 2019/0287512 A1 | 9/2019 | Zoller et al. | |
| 2019/0347118 A1* | 11/2019 | Mukherjee | G06F 9/453 |

(56) References Cited

U.S. PATENT DOCUMENTS

2021/0089375 A1* 3/2021 Ghafourifar ............ G06F 9/453
2021/0200780 A1* 7/2021 Puvvada ............. G06F 16/2282

OTHER PUBLICATIONS

K. Leman, PDA Based Human Motion Recognition System. (Year: 2005).*
Justin Matejka, CommunityCommands: Command Recommendations for Software Applications. (Year: 2009).*
P. Milhorat, Building The Next Generation of Personal Digital Assistants. (Year: 2014).*
Final Office Action dated Feb. 3, 2020 in U.S. Appl. No. 16/041,341, 58 pages.
International Preliminary Report on Patentability received for PCT Patent Application No. PCT/US2018/048067, mailed on May 7, 2020, 7 pages.
Notice of Allowance dated Aug. 31, 2020 in U.S. Appl. No. 16/521,504, 8 pages.
Notice of Allowance dated Sep. 14, 2020 in U.S. Appl. No. 16/041,341, 8 pages.
Notice of Allowance dated Sep. 23, 2020 in U.S. Appl. No. 16/041,341, 5 pages.
Notice of Allowance dated Oct. 15, 2020 in U.S. Appl. No. 16/521,504, 3 pages.
Notice of Allowance dated Oct. 21, 2020 in U.S. Appl. No. 16/521,504, 4 pages.
Notice of Allowance dated Mar. 18, 2021 in U.S. Appl. No. 15/936,007, 9 pages.
Notice of Allowance dated Apr. 8, 2021 in U.S. Appl. No. 16/038,993, 3 pages.
Partial European Search Report and Opinion received for EP Patent Application No. 18801977.2, mailed on Apr. 23, 2021, 17 pages.
Notice of Allowance dated Apr. 30, 2021 in U.S. Appl. No. 15/936,007, 9 pages.
Notice of Allowance dated May 13, 2021 in U.S. Appl. No. 16/038,993, 3 pages.
Notice of Allowance dated May 20, 2021 in U.S. Appl. No. 16/038,993, 3 pages.
Notice of Allowance dated Jun. 9, 2021 in U.S. Appl. No. 15/936,007, 9 pages.
Extended European Search Report and Opinion received for EP Patent Application No. 19748228.4, mailed on Sep. 24, 2021, 11 pages.
Final Office Action dated Nov. 3, 2021, in U.S. Appl. No. 16/110,108, 19 pages.
Non-Final Office Action dated Jul. 12, 2021 in U.S. Appl. No. 16/110,103, 20 pages.
Non-Final Office Action dated Sep. 2, 2021 in U.S. Appl. No. 15/984,122, 20 pages.
"Hash table—Wikipedia", Retrieved from the Internet URL : https://en.wikipedia.org/w/index.php?title=Hash_lable&oldid=753684620, accessed on Sep. 9, 2021, pp. 1-17 (2016).
Extended European Search Report and Opinion received for European Patent Application No. 18801977.2, mailed on Jul. 22, 2021, 17 pages.
Extended European Search Report and Opinion received for European Patent Application No. 18802605.8, mailed on Apr. 14, 2021, 8 pages.
Non-Final Office Action dated May 11, 2021 in U.S. Appl. No. 16/110,108, 18 pages.
International Preliminary Report on Patentability received for PCT Application No. PCT/US2019/042453, mailed on Jan. 28, 2021, 7 pages.
Notice of Allowance dated Feb. 8, 2021 in U.S. Appl. No. 16/038,993, 6 pages.
Notice of Allowance dated Mar. 3, 2021 in U.S. Appl. No. 15/936,007, 12 pages.
Extended European Search Report and Opinion received for European Patent Application No. 18802499.6, mailed on Apr. 9, 2021, 9 pages.
Notice of Allowance dated Nov. 6, 2020, in U.S. Appl. No. 16/038,993, 6 pages.
Final Office Action dated Aug. 4, 2020 in U.S. Appl. No. 15/984,122, 18 pages.
Notice of Allowance dated Aug. 19, 2020 in U.S. Appl. No. 16/038,993, 7 pages.
Final Office Action dated Sep. 18, 2020 in U.S. Appl. No. 16/110,108, 17 pages.
Final Office Action dated Oct. 20, 2020 in U.S. Appl. No. 15/936,007, 33 pages.
International Preliminary Report on PatenTability received for PCT Application No. PCT/US2019/015839, mailed on Aug. 13, 2020, 12 pages.
Preinterview First Office Action dated Jun. 8, 2020 in U.S. Appl. No. 16/521,504, 4 pages.
Final Office Action dated Jul. 24, 2020 in U.S. Appl. No. 16/110,103, 17 pages.
International Preliminary Report on Patentability for PCT Application No. PCT/US2018/048064 mailed on May 7, 2020, 5 pages.
International Preliminary Report on Patentability for PCT Application No. PCT/US2018/048066 mailed on May 7, 2020, 9 pages.
Preinterview First Office Action dated Feb. 13, 2020, in U.S. Appl. No. 16/261,657, 5 pages.
Non-Final Office Action dated Feb. 25, 2020 in U.S. Appl. No. 15/936,007, 29 pages.
First Action Interview Office Action dated Mar. 2, 2020, in U.S. Appl. No. 15/984,122, 3 pages.
First Action Interview Office Action dated Mar. 3, 2020, in U.S. Appl. No. 16/038,993, 16 pages.
First Action Interview Office Action dated Mar. 16, 2020, in U.S. Appl. No. 16/110,108, 6 pages.
Notice of Allowance dated Apr. 28, 2020, in U.S. Appl. No. 16/261,657, 7 pages.
First Action Interview Preinterview Communication mailed Nov. 29, 2019 in U.S. Appl. No. 16/038,993, 6 pages.
First Action Interview Preinterview Communication mailed Jan. 15, 2020 in U.S. Appl. No. 15/984,122, 5 pages.
First Action Interview Preinterview Communication mailed Jan. 16, 2020 in U.S. Appl. No. 16/110,108, 5 pages.
International Search Report and Written Opinion mailed Oct. 21, 2019 in International Patent Application No. PCT/US19/42453, 14 pages.
First Action Interview Preinterview Communication mailed Oct. 9, 2019 in U.S. Appl. No. 16/110,103, 3 pages.
International Preliminary Report on Patentability mailed Aug. 2, 2019 in International Patent Application No. PCT/US2018/033518, 17 pages.
International Preliminary Report on Patentability mailed Aug. 19, 2019 in International Patent Application No. PCT/US2018/033425, 18 pages.
International Search Report and Written Opinion mailed Apr. 11, 2019 in International Patent Application No. PCT/US2019/015839, 13 pages.
International Search Report and Written Opinion in International Application No. PCT/US18/33446, mailed Aug. 24, 2018, 12 pages.
International Search Report and Written Opinion mailed Nov. 19, 2018 in International Patent Application No. PCT/US18/48064, 7 pages.
International Search Report and Written Opinion mailed Oct. 29, 2018 in International Patent Application No. PCT/US18/33518, 12 pages.
International Search Report and Written Opinion mailed Oct. 18, 2018 in International Patent Application No. PCT/US 18/48066, 10 pages.
International Search Report and Written Opinion mailed Aug. 9, 2018 in International Patent Application No. PCT/US 18/33425, 10 pages.

* cited by examiner

ACTION RECIPES FOR A CROWDSOURCED DIGITAL ASSISTANT SYSTEM

CROSS-REFERENCE TO RELATED APPLICATIONS

This application is a continuation of U.S. patent application Ser. No. 15/936,001 filed Mar. 26, 2018, now U.S. Pat. No. 11,340,925, which is related by subject matter to and claims the benefit of U.S. Provisional Patent Application No. 62/508,181, filed May 18, 2017, entitled "SYSTEMS AND METHODS FOR CROWDSOURCED ACTIONS AND COMMANDS," U.S. Provisional Patent Application No. 62/509,534, filed May 22, 2017, entitled "CONNECTING MULTIPLE MOBILE DEVICES TO A SMART HOME ASSISTANT ACCOUNT," U.S. Provisional Patent Application No. 62/576,804, filed Oct. 25, 2017, entitled "CONNECTING MULTIPLE MOBILE DEVICES TO A SMART HOME ASSISTANT ACCOUNT," U.S. Provisional Patent Application No. 62/539,866, filed Aug. 1, 2017, entitled "OPTIMIZING DISPLAY ENGAGEMENT IN ACTION AUTOMATION," U.S. Provisional Patent Application No. 62/576,766, filed Oct. 25, 2017, entitled "A CROWDSOURCED DIGITAL ASSISTANT SYSTEM," and U.S. Provisional Patent Application No. 62/613,165, filed Jan. 3, 2018, entitled "ACTION RECIPES FOR CROWDSOURCED DIGITAL ASSISTANT SYSTEM," which are incorporated herein by reference in their entirety.

BACKGROUND

Digital assistants have become ubiquitous in a variety of consumer electronic devices. Modern day digital assistants employ speech recognition technologies to provide a conversational interface between users and electronic devices. These digital assistants can employ various algorithms, such as natural language processing, to improve interpretations of commands received from a user. Consumers have expressed various frustrations with conventional digital assistants due to privacy concerns, constant misinterpretations of spoken commands, unavailability of services due to weak signals or a lack of signal, and the general requirement that the consumer must structure their spoken command in a dialect that is uncomfortable for them. Further, the actions resulting from these commands in existing digital assistants typically do not execute the functions within applications already available on the mobile devices, which are often what users would like to do when on the move. Finally, existing digital assistants do not execute multiple functions, whether within a single application or across multiple applications.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention are directed to action recipes for a crowdsourced digital assistant application. An action recipe can be recorded or otherwise defined to perform a sequence actions across one or more applications. By way of nonlimiting example, a user may define an action recipe to be executed when leaving the home by recording the following actions. First, the user turns on the house alarm using HONEYWELL TOTAL CONNECT®. Second, the user sets the sprinkler system using RACHIO®. Third, the user lowers the temperature of the thermostat using NEST®. Once an action recipe has been recorded or otherwise defined, the action recipe can be associated with one or more commands (e.g., "I'm leaving home now"). A corresponding action recipe dataset can be generated, including a representation of the set of inputs, applications and associated commands. The action recipe dataset can be stored and indexed on a user device and/or on an action cloud server. As such, any user can invoke a defined action recipe by providing an associated command to the crowdsourced digital assistant application or executing a sequence of actions across one or more apps.

For example, upon receiving a command, the crowdsourced digital assistant can search for a matching command on the user device and/or the action cloud server. If a match is located, the corresponding action recipe dataset is accessed, and the crowdsourced digital assistant emulates the actions in the action recipe on the user device. In some embodiments, if a command is not recognized, an action recipe can be constructed on the fly by parsing a received command into one or more sub-commands, and the sub-commands can be processed as a sequence of actions. As such, a user can efficiently and effectively perform multiple actions using a single command, whether within one application or multiple applications. This can happen via the original user command being split into multiple recognized sub-commands already associated with actions.

In some embodiments, the digital assistant application can execute action recipes by passing data from one action or application to another action or application. For example, if one action generates an output (e.g., an ETA from a navigation app) for use in a second application (e.g., texting the ETA to a particular contact), the action recipe can utilize the output from one action as an input into another application. In some embodiments, the digital assistant application can apply a transformation to the data that gets passed between actions using one or more transformation and/or compatibility rules. Additionally and/or alternatively, an action within an action recipe can be bound or otherwise associated with a particular function (e.g., determining a temperature), as opposed to being associated with a particular application. As such, a variety of applications might be available to perform a particular function, and selected based on availability and/or a priority order. Additionally and/or alternatively, an action might be defined to perform functions across multiple applications (e.g., to find the best price for a room across multiple applications).

As such, the digital assistant application disclosed herein facilitates efficient and effective control of any number of disparate applications to perform any number of actions using customized commands.

BRIEF DESCRIPTION OF THE DRAWINGS

Aspects of the present disclosure are described in detail below with reference to the attached documents, wherein.

DETAILED DESCRIPTION

Overview

Figure 1:
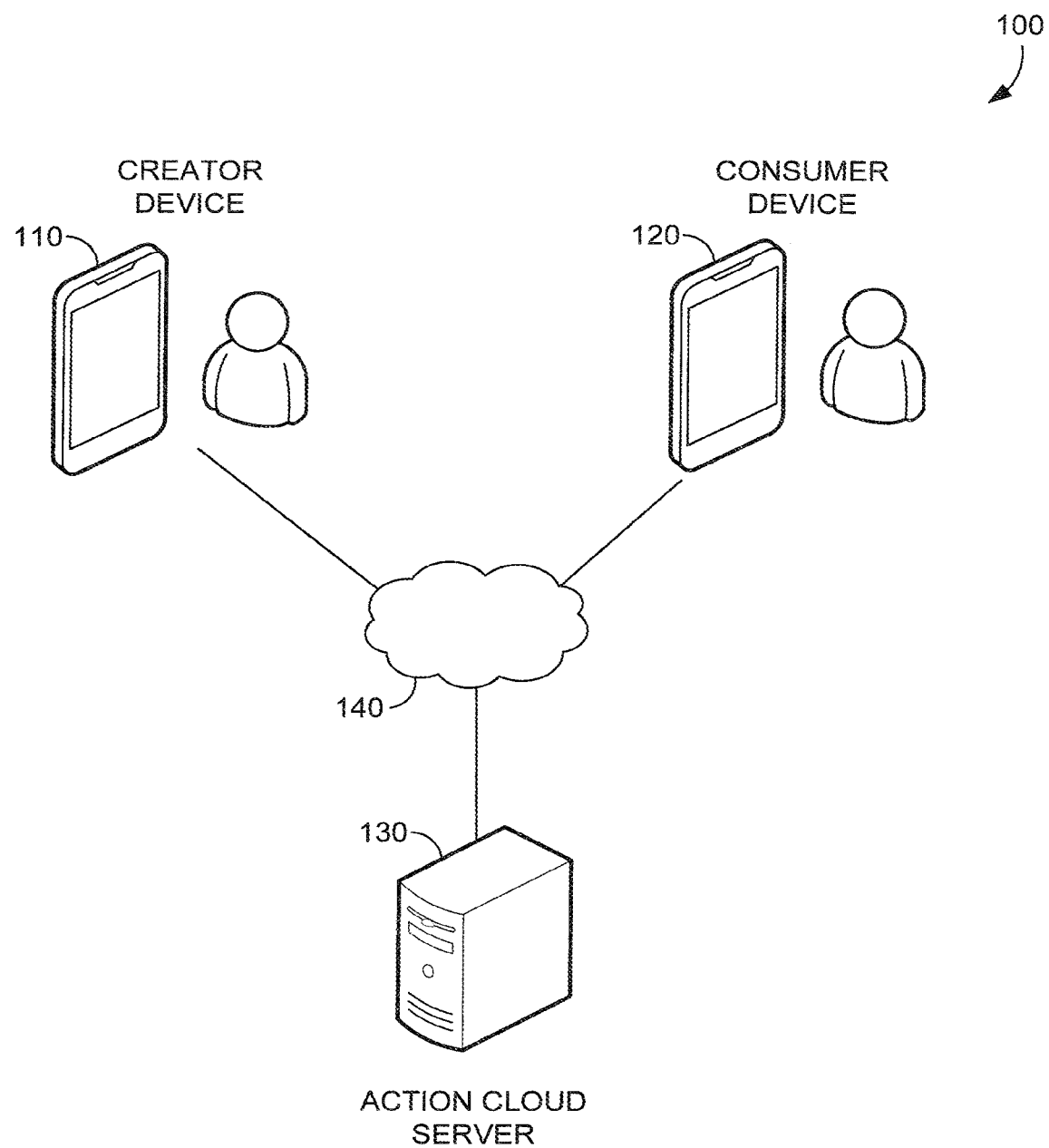
FIG. 1 is a block diagram of an exemplary computing system for using action recipes, in accordance with embodiments of the present invention.

Generally, conventional digital assistants provide an interface for accessing various functionality using actions, functions, skills, and the like, of the digital assistant. Conventional digital assistants include various drawbacks. For example, digital assistants often employ speech recognition technologies to provide a conversational interface for consumers to access such functionality using commands that often include the name of the corresponding function or other pre-determined syntax. In such systems, the syntax of the command is important, so the name of the function or pre-determined syntax must be included in the command. If a consumer using a digital assistant wants to navigate logically, the rigid syntax requirements of conventional digital assistants can increase the cognitive load required to execute a command by requiring the consumer to think of the command syntax in addition to the desired functionality. Similarly, a user may desire flexibility to use abbreviated or other custom commands. For example, a user may always want to use SPOTIFY® to play music. However, conventional digital assistants do not provide a way to customize commands. Instead, the user must use the predetermined command syntax (e.g., "play some jazz on SPOTIFY"). This, can be tedious and time consuming.

Further, actions performed by conventional digital assistants typically do not execute corresponding functions within applications already available on the mobile devices. Moreover, although some digital assistants provide an interface to perform functionality for certain third party applications (e.g., SPOTIFY), the digital assistant may not support other third party applications (e.g., FACEBOOK®). If such an interface does not exist (e.g., the interface has not been created yet, an affirmative decision not to integrate has been made by the digital assistant provider or a third party software provider, etc.), there is no way for a consumer to use the digital assistant to perform functions within those unsupported third party applications. Instead, a user must manually navigate the unsupported third party application and perform the desired functions directly within the app. Again, such a process is tedious and time consuming, resulting in an unsatisfactory process.

Sometimes, a user may desire to use a digital assistant to invoke specific functionality using a supported application, but the desired functionality is not supported by the digital assistant. For example, a user may want to add a song to a SPOTIFY playlist using the digital assistant. Even though some digital assistants provide an interface for such third party applications, there is currently no command available to add a song to a SPOTIFY playlist using various digital assistants. Similarly, there is no way for users to design a command to perform this function.

Often times, a user might desire to perform consecutive actions using one or more applications. For example, a user might want to play a particular song and turn up the speaker volume. However, conventional digital assistants do not provide a way to execute consecutive functions, whether in the same application or in different ones. For example, conventional digital assistants will not understand or respond to a combination of commands such as "play Don't Wanna Fight by ALABAMA SHAKES® and turn the volume up to 8." Instead, the user must provide a first command (e.g., "play Don't Wanna Fight by ALABAMA SHAKES"), wait for the corresponding action to execute, then provide a second command (e.g., "volume 8"), and wait for the corresponding second action to execute. This process may be repeated for each additional command (e.g., "add this song to my library"). Such a process can be tedious and time consuming.

Accordingly, embodiments of the present invention are directed to action recipes for a crowdsourced digital assistant. An action recipe is a sequence of actions to be performed. An action recipe can be recorded or otherwise defined to perform actions across one or more applications, and the action recipe can be associated with one or more commands. Users can define an action recipe in various ways. For example, a user can define an action recipe by recording or otherwise defining a set of inputs across one or more applications, by selecting and adding existing actions to a particular recipe, by including multiple sub-commands in a single on-the-fly command, or otherwise. A corresponding action recipe dataset can be stored and indexed on a user device and/or on an action cloud server and either be kept private for the creator or shared across all users of the system. As such, any user can invoke a defined action recipe by providing an associated command or commands to the crowdsourced digital assistant. The crowdsourced digital assistant searches for a matching command(s) on the user device and/or the action cloud server, and if a match is located, the corresponding action recipe dataset is accessed, and the crowdsourced digital assistant emulates the actions in the action recipe on the user device. As such, a user can efficiently and effectively perform multiple actions using a single command, whether within one application or multiple applications. The user can also initiate a recipe by tapping on a visual icon or other artifact displayed on the user's device.

Initially, an individual action can be recorded or otherwise defined based on a set of inputs into an application. For example, a digital assistant application on a user device can permit a user initiate an action recording for a desired application (e.g., SPOTIFY), upon which, the user can navigate the application to perform a desired action (e.g., by clicking the search bar, typing in "GREYBOY," navigating to the band's artist page, and clicking the Shuffle Songs button). Generally, the user performs an action by entering a set of inputs (e.g., touches, selections, interactions, entered parameters, and the like) for the selected application. During this time, the digital assistant application records the set of inputs. When the user is finished, the user may stop the recording (e.g., by entering an input assigned to stop the recording, such as pressing a device button, touching an assigned portion of a touchscreen, etc.). Additionally and/or alternatively to recording a set of inputs entered into a selected application to define an action, one or more inputs may be entered into the digital assistant application to define a particular action. For example, an action (or some portion thereof) may be defined using an API call and/or a deep link that invokes and provides one or more inputs to a particular application. The API call and/or deep link can be generated using parameters from one or more detected inputs into the digital assistant application. Regardless of how an action is defined, the digital assistant application may prompt the user for, or otherwise permit the user to enter, a set of commands that should be associated with the action (e.g., "I want to hear GREYBOY," "please play GREYBOY," "play music from GREYBOY, "let's listen to some music by GREYBOY," etc.). In some embodiments, a user may desire to invoke a recorded action (e.g., shuffling songs by a particular band) using a contextual input parameter within a particular command (e.g., COLDPLAY® instead of GREYBOY). Generally, contextual input parameters can be automatically detected from a set of inputs, manually assigned, clarified by a user input prompted during execution of the action, or some combination thereof. Prompting for input parameters is described in more detail in Applicant's U.S. App. Ser. No. 62/610,792, the contents of which are herein incorporated by reference in their entirety. Contextual input parameters within a particular command can be used as an input into an application. The digital assistant application can create an action dataset that includes the recorded set of inputs (including designated contextual input parameters) and associated commands. The action dataset is stored locally on the user's device and/or remotely on an action cloud server. As such, any user can access the action from the action cloud server using one of the associated commands.

Similarly, an action recipe can be recorded or otherwise defined based on a set of inputs into one or more applications. In some embodiments, a digital assistant application on a user device can permit a user to initiate a recording of an action recipe. For example, when a user initiates a recording mode for an action recipe using a user interface of the digital assistant application, the digital assistant application can permit the user to navigate among a variety of applications to perform desired actions in each application by entering a set of inputs (e.g., touches, selections, interactions, entered parameters, and the like). During this time, the digital assistant application records the set of inputs and corresponding applications. When the user is finished, the user may stop recording (e.g., by entering an input assigned to stop the recording, such as pressing a device button, touching an assigned portion of a touchscreen, etc.). Additionally and/or alternatively to recording a set of inputs entered into various applications to define an action recipe, one or more inputs may be entered into the digital assistant application to define one or more of the actions for an action recipe. For example, one or more actions (or some portion thereof) may be defined using an API call and/or a deep link that invokes and provides one or more inputs to a particular application. The API call and/or deep link can be generated using parameters from one or more detected inputs into the digital assistant application. Regardless of how an action is defined, the digital assistant application may prompt the user for, or otherwise permit the user to enter, a set of commands that should be associated with the action recipe. Similarly, the user interface may permit the user to name the action recipe, and the name of the action recipe can be used for an associated command. Input parameters can be automatically detected, manually assigned, clarified by a user input prompted during execution of the action recipe, or some combination thereof. The digital assistant application can create an action recipe dataset that includes the set of inputs (including input parameters), corresponding applications and associated commands. The action recipe dataset is stored locally on the user's device and/or remotely on an action cloud server. As such, any user can access the action recipe from the action cloud server using one of the associated commands.

Additionally and/or alternatively, an action recipe can be constructed with individual actions. For example, a user interface of the digital assistant application can permit a user to display or otherwise access one or more existing actions (e.g., by speaking, typing or selecting a command such as "show my actions"). The user interface may permit a user to select one or more existing actions (e.g., using a touch command, a voice command, or otherwise) and prompt the user to add the selected action to a desired action recipe (e.g., via a pop-up menu, some other touch command, a voice command, or otherwise). As such, a user can construct an action recipe using existing actions. Similarly, the user interface may permit a user to add to an action recipe one or more actions that have not yet been recorded. For example, the action recipe may include a placeholder for an action, and the digital assistant application may permit the user to record the action, for example, when adding it to a recipe, or at some later time. As such, a user can define an action recipe by selecting individual actions to include in the recipe.

Consider, by way of nonlimiting example, a scenario where a user regularly uses three different applications during her daily commute. She first disables calls and message via the app TEXTDRIVE. She then starts her favorite podcast on NPR®. Finally, given the Bay Area traffic, she starts navigation to optimize her travel time using GOOGLE® MAPS. Instead of operating these three apps individually, the user can define an action recipe as a sequence of these three actions, and associate the action recipe with a command such as "start my morning commute." Now when the user is ready to leave for work, when she gets into the car, she simply issues the command "start my commute to work," and the digital assistant application emulates the sequence of actions across the three applications.

Generally, a digital assistant application and/or an action recipe can pass data from one action or application to another action or application. For example, a user might define an action recipe that finds a ride home from the San Jose airport using UBER® and sends the ETA to his wife using WHATSAPP®. In this manner, the digital assistant application executes the first action to generate an output (the ETA) that gets passed to the second action as an input (to WHATSAPP). In some embodiments, the digital assistant application can apply a transformation to the data that gets passed between actions using one or more transformation and/or compatibility rules.

In some embodiments, an action within an action recipe can be bound or otherwise associated with a particular function, as opposed to being associated with a particular application. Instead, multiple applications might be available to perform a particular function. In this manner, if a primary application is unavailable (e.g., TRAVELOCITY®'s server is not responding), the action recipe can dynamically replace the unavailable application with an alternate compatible application (e.g., KAYAK®). Additionally and/or alternatively, an action might be defined to perform functions across multiple applications. For example, an action might be defined to find the best price for a room across multiple applications (e.g., KAYAK, TRAVELOCITY, HOTELS.COM®, AIRBNB®, etc.).

As such, the digital assistant application disclosed herein facilitates efficient and effective control of any number of disparate applications to perform any number of actions using customized commands.

Exemplary Crowdsourced Digital Assistant Environment

Referring now to FIG. 1, a block diagram of exemplary environment 100 suitable for use in implementing embodiments of the invention is shown. Generally, environment 100 is suitable for recording, executing and crowdsourcing action recipes, and, among other things, facilitates emulating actions across one or more applications. Environment 100 includes creator device 110, consumer device 120, action cloud server 130 and network 140. Creator device 110 and consumer device 120 can be any kind of computing device capable of facilitating emulation of actions across one or more applications. For example, in an embodiment, creator device 110 and consumer device 120 can be a computing device such as computing device 800, as described below with reference to FIG. 6. In embodiments, creator device 110 and consumer device 120 can be a personal computer (PC), a laptop computer, a workstation, a mobile computing device, a PDA, a cell phone, or the like. Similarly, action cloud server 130 can be any kind of computing device capable of facilitating crowdsourcing of action recipes. For example, in an embodiment, action cloud server 130 can be a computing device such as computing device 800, as described below with reference to FIG. 8. In some embodiments, action cloud server 130 comprises one or more server computers, whether distributed or otherwise. Generally, the components of environment 100 may communicate with each other via a network 140, which may include, without limitation, one or more local area networks (LANs) and/or wide area networks (WANs). Such networking environments are commonplace in offices, enterprise-wide computer networks, intranets, and the Internet.

Figure 2:
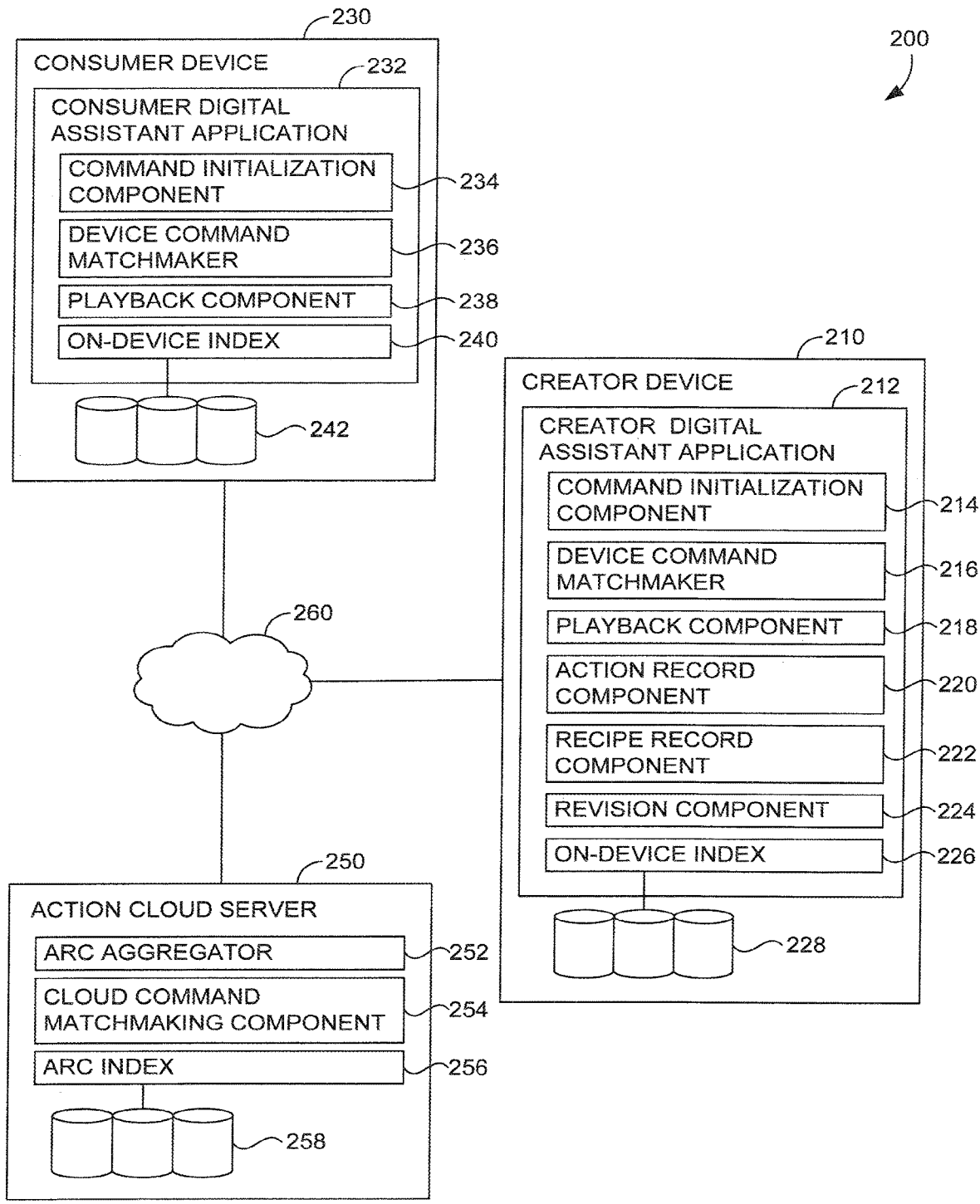
FIG. 2 is a block diagram of an exemplary computing system for using action recipes, in accordance with embodiments of the present invention.

Referring now to FIG. 2, a block diagram of exemplary environment 200 suitable for use in implementing embodiments of the invention is shown. Generally, environment 200 is suitable for recording, executing and crowdsourcing action recipes, and, among other things, facilitates emulating actions across one or more applications. Environment 200 includes creator device 210 (which may correspond to creator device 110 of FIG. 1), consumer device 230 (which may correspond to consumer device 120 of FIG. 1), action cloud server 250 (which may correspond to action cloud server 130 of FIG. 1) and network 260 (which may correspond to network 140 of FIG. 1). Generally, the components of environment 100 may communicate with each other via a network 260, which may include, without limitation, one or more local area networks (LANs) and/or wide area networks (WANs).

Environment 200 includes creator device 210 with creator digital assistant application 212, and likewise includes consumer device 230 with consumer digital assistant application 232. In the embodiment depicted in FIG. 2, there are different creator and consumer digital assistant applications, however, this need not be the case. For example, in some embodiments, the applications may be the same, but functionality may be selectively enabled or disabled, for example, based on a user profile or other differentiating mechanism.

Generally, a digital assistant application may be any application capable of facilitating execution of action recipes, recording or otherwise defining action recipes, and/or crowdsourcing of action recipes. For example, in some embodiments, a digital assistant application can be built on top of an actions software development kit that provides access to any of the functionality described herein. The actions kit, or any of the functionality described herein, may be incorporated or integrated into an application or an add-on or plug-in to an application, such as creator digital assistant application 212 and/or consumer digital assistant application 232. Creator digital assistant application 212 and/or consumer digital assistant application 232 may be a stand-alone application(s), a mobile application(s), a web application(s), or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). Although generally discussed herein as a digital assistant application, in some cases, the application, or portion thereof, can be additionally or alternatively integrated into an operating system (e.g., as a service) or a server (e.g., a remote server).

In the embodiment depicted in FIG. 2, consumer digital assistant application 232 includes command initialization component 234, device command matchmaker 236, playback component 238 and on-device index 240. Generally, command initialization component 234 detects input commands, and device command matchmaker 236 searches on-device index 240 and/or action, recipe, and command ("ARC") index 256 of action cloud server 250 for a matching command. If a matching command is located, a corresponding action dataset and/or action recipe dataset is accessed, and playback component 238 executes the corresponding action and/or action recipe.

Command initialization component 234 can optionally be configured to receive a command trigger (e.g., through an I/O component of consumer device 230). Any input can be assigned as a command trigger (e.g., a device button such as a home button of consumer device 230, an assigned portion of a touchscreen, etc.). Once a command trigger is received, command initialization component 234 can initialize a detection of one or more spoken commands, typed commands and/or some other command representation assigned to an action. In some embodiments, command initialization component 234 need not include a command trigger to begin detecting the one or more command representations. In some embodiments, command initialization component 234 can convert spoken commands to a textual representation for subsequent analysis.

Device command matchmaker 236 generally matches received commands (e.g., a textual representation) with commands stored, e.g., on-device, on the cloud, etc. For example, in one embodiment, on-device index 240 is a searchable index of the actions and action recipes (e.g., action datasets and action recipe datasets) that are stored in on-device data store 242. On-device data store 242 and on-device index 240 can be updated (e.g., periodically) by making calls to action cloud server 250 to enhance an on-device index. In some embodiments, the on-device index 240 is a first location searched for a matching command. If a match is not located, device command matchmaker 236 can access action cloud server 250 to search ARC index for a match with commands stored on ARC data store 258. In this manner, any locally stored actions and/or action recipes are available for immediate access, reducing latency over conventional digital assistants that access commands remotely. Similarly, when textual representation of a command is transmitted to action cloud server 258 to match a command for an action and/or action recipe stored therein, latency is reduced over conventional digital assistants that transmit larger audio files to a cloud server. Other variations for indexing actions and action recipes, and other search prioritization schemes may be implemented. As such, the digital assistant application disclosed herein can match commands using the most updated matching models in the cloud.

If a matching command is located, a corresponding action and/or action recipe (e.g., action dataset and/or action recipe dataset) can be accessed and provided to playback component 238. Generally, playback component 238 emulates the corresponding action and/or action recipe using the accessed dataset. For an action recipe, this can include executing the recipe by emulating a corresponding set of recorded inputs for a recorded sequence of actions across one or more corresponding applications. Executing an action recipe can include passing data between actions, dynamic replacement of applications, binding or otherwise associating an action to a function, or otherwise. In some embodiments, if an action and/or action recipe is accessed and involves an application which has not been installed on consumer device 230, consumer digital assistant application 232 can prompt the user to download the app, or otherwise provide a corresponding notification. As such, a consumer can efficiently and effectively access and execute crowdsourced actions and action recipes using a local device.

In some embodiments, playback component 238 can pass data from one action or application to another action or application. For example, an action recipe might be defined that finds a user's location using GOOGLE MAPS and sends the determined location to a friend using WHATSAPP. In these embodiments, playback component 238 executes the first action to generate the user's location as an output (e.g., using GOOGLE MAPS), and playback component 238 passes the user's determined location to the second action as an input (to WHATSAPP). In some embodiments, playback component 238 can apply a transformation to the data that gets passed between actions using data passing parameters that define one or more transformation and/or compatibility rules. For example, if the user's location is generated as a pair of latitude and longitude coordinates, data passing parameters can define a transformation to be applied to the determined location (e.g., to generate an address, a neighborhood, crossroads, and the like) before passing the location to the subsequent action. Other variations of transformations and compatibility rules will be understood by those of ordinary skill in the art.

In some embodiments, an action can be bound or otherwise associated with a particular function, as opposed to being associated with a particular application. For example, multiple applications might be available to perform a particular function. In this manner, if a primary application is unavailable (e.g., TRAVELOCITY's server is not responding), playback component 238 can dynamically replace the unavailable application with an alternate compatible application (e.g., KAYAK) to perform the function. Alternative, compatible applications may be invoked based on a set of alternative applications for a designated function and/or a priority order for alternative applications, whether user-selected or otherwise. Additionally and/or alternatively, an action might be defined to perform functions across multiple applications. For example, an action might be defined to find the best price for a room across multiple applications (e.g., KAYAK, TRAVELOCITY, HOTELS.COM, AIRBNB, etc.). In these embodiments, playback component 238 can perform a bound function (e.g., locate an available room for the best price) using a set of assigned applications for that function, whether user-selected or otherwise. Various functions can be supported to provide any kind of input or output (e.g., city, price, time, temperature, etc.).

Turning now to creator device 210 and creator digital assistant application 212, in some embodiments, a digital assistant application can be provided to permit a user to record or otherwise define actions and/or action recipes. Accordingly, in addition or alternatively to components that facilitate playback functionality (e.g., command initialization component 214, device command matchmaker 216 and playback component 218, which may correspond to the components of consumer digital assistant application 232 described above), creator digital assistant application 212 includes components that facilitate recording or otherwise defining actions and/or action recipes, including action record component 220, recipe record component 222 and revision component 224. Although corresponding recording components are not depicted in consumer digital assistant application 232 in FIG. 2, in some embodiments, some or all of these components may be incorporated or otherwise available to consumer digital assistant application 232.

Action record component 220 generally facilitates recording an action, and may include one or more sub-components not depicted in FIG. 2, such as an action recording initialization component, an action recording component, an action command definition component, and an action indexer. The action recording initialization component can receive an instruction to generate an action dataset associated with a particular application (e.g., a third party application such as SPOTIFY). For example, the action recording initialization component can receive a selection of a particular application within which to record an action. Additionally and/or alternatively, the action recording initialization component can receive an action record trigger (e.g., pressing a device button, touching an assigned portion of a touchscreen, receiving a selection of an application, etc.). Generally, the action recording initialization component initializes a recording of an action. Once initialized, the action recording component records an action (e.g., an action dataset) based on a set of user inputs into the selected application. For example, the action recording component can detect a set of inputs into the selected application (e.g., touches, selections, interactions, entered parameters, and the like). During this time, the action recording component records the set of inputs (e.g., a user clicking the search bar in SPOTIFY, typing in "GREYBOY," navigating to the band's artist page, and clicking the Shuffle Songs button). When the user is finished, the user may stop the recording (e.g., by entering an input assigned to stop the recording, such as pressing a device button, touching an assigned portion of a touchscreen, etc.), and the action recording component generates an action dataset that includes a representation of the detected set of inputs.

Once a recording is complete, the action command definition component may prompt the user for, or otherwise permit the user to enter, a set of commands that should be associated with the action (e.g., "I want to hear GREYBOY," "please play GREYBOY," "play music from GREYBOY, "let's listen to some music by GREYBOY," etc.). In some embodiments, a user may desire to invoke a recorded action (e.g., shuffling songs by a particular band) using a contextual input parameter within a command (e.g., COLDPLAY instead of GREYBOY). Generally, contextual input parameters can be automatically detected from a set of inputs, manually assigned, clarified by a user input prompted during execution of the action, or some combination thereof. The action command definition component can include or otherwise associate the commands with the action dataset.

To make the action dataset searchable, action record component 220 (e.g., the action indexer) can index the action (e.g., action dataset) in on-device index 240 and store the action in on-device data store 242. Additionally and/or alternatively, action record component 220 can submit the action to action cloud server 250 (e.g., through an API) for indexing in ARC index 256 and/or storage in ARC data store 258. As such, any user can access the action from action cloud server 250 using one of the associated commands, as described above.

In the embodiment depicted in FIG. 2, creator digital assistant application 212 includes recipe record component 222. Generally, recipe record component 222 facilitates recording an action recipe, and may include one or more sub-components not depicted in FIG. 2, such as an action recipe recording initialization component, an action recipe recording component, an action recipe command definition component, and an action recipe indexer. Recipe record component 222 (e.g., via an action recording initialization component) can receive an instruction to generate an action recipe dataset associated. For example, the action recording initialization component can receive an action recipe record trigger (e.g., pressing a device button, touching an assigned portion of a touchscreen, receiving a selection of an application, etc.). Generally, the action recording initialization component initializes a recording of an action. Once initialized, the action recording component records an action recipe (e.g., an action recipe dataset) based on a set of user inputs into one or more applications. For example, the action recipe recording component can detect a set of inputs into one or more applications (e.g., touches, selections, interactions, entered parameters, and the like). During this time, the action recipe recording component records the set of inputs (e.g., opening the UBER app, requesting a ride home, copying the ETA, opening WHATSAPP, selecting a chat with a particular person, typing in a message, pasting the ETA from UBER, and sending the text). When the user is finished, the user may stop the recording (e.g., by entering an input assigned to stop the recording, such as pressing a device button, touching an assigned portion of a touchscreen, etc.), and the action recipe recording component generates an action recipe dataset that includes a representation of the detected set of inputs and corresponding applications.

Additionally and/or alternatively, recipe record component 222 (e.g., via the action recipe recording component and/or revision component 224) may facilitate constructing an action recipe with individual actions. For example, a user interface can permit a user to display or otherwise access one or more existing actions (e.g., by speaking, typing or selecting a command such as "show my actions"). The user interface may permit a user to select one or more existing actions (e.g., using a touch command, a voice command, or otherwise) and prompt the user to add the selected action to a desired action recipe (e.g., via a pop-up menu, some other touch command, a voice command, or otherwise). As such, a user can construct an action recipe using existing actions. Similarly, the user interface may permit a user to add to an action recipe one or more actions that have not yet been recorded. For example, an action recipe may include a placeholder for an action, and recipe record component 222 may permit the user to record the action, for example, when adding it to a recipe, or at some later time. As such, a user can define an action recipe by selecting individual actions to include in the recipe.

In some embodiments, an action recipe can be constructed on-the-fly. For example, although an action recipe has not previously been defined, a user might initiate a command (e.g., using command initialization component 214) to initialize a detection of a series of spoken commands, typed commands and/or some other command representations. Instead of, or in addition to searching an index for a matching command (e.g., if no matching commands are identified), creator digital assistant application 212 (e.g., via command initialization component and/or recipe record component 222) can parse the received command into one or more subcommands. For example, a received command such as "find hotels in Dallas and show me places to eat there" might get parsed into separate sub-commands (e.g., "find hotels in Dallas" using HOTELS.COM and "show me places to eat there" using YELP®). If one or more of the sub-commands can be matched (e.g., using device command matchmaker 216), the corresponding actions can be executed (e.g., using playback component 218), provided to the user for approval and saving, and/or used to construct a new action recipe based on the identified actions. In this manner, by simply speaking in natural language, a received command can be automatically decomposed into its constituent parts to construct an action recipe on-the-fly.

Once a recording or other definition of an action recipe is complete, recipe record component 222 (e.g., via the action recipe command definition component) may prompt the user for, or otherwise permit the user to enter, a set of commands that should be associated with the action recipe. Similarly, a user interface may permit the user to name the action recipe, and the name of the action recipe can be used for an associated command. Input parameters can be automatically detected, manually assigned, or some combination thereof. As such, recipe record component 222 (e.g., via the action recipe command definition component) can create an action recipe dataset that includes the set of inputs (including input parameters), corresponding applications and associated commands.

Generally, action recipe record component 222 (e.g., via the action recipe indexer) can index the action recipe (e.g., action recipe dataset) in on-device index 226 and store the action in on-device data store 228. Additionally and/or alternatively, action recipe record component 222 can submit the action recipe to action cloud server 250 (e.g., through an API) for indexing in ARC index 256 and/or storage in ARC data store 258. As such, any user can access the action recipe from the action cloud server by entering one of the associated commands, as described in more detail above.

In the embodiment depicted in FIG. 2, creator digital assistant application 212 includes revision component 224. Generally, revision component 224 provides a user interface that facilitates searching for and editing actions and/or action recipes. For example, a user interface can permit a user to display or otherwise access one or more existing actions (e.g., by speaking, typing or selecting a command such as "show my actions") and/or one or more existing action recipes (e.g., by speaking, typing or selecting a command such as "show my action recipes"). In some embodiments, various search algorithms can be implemented to search for a matching action and/or action recipe. For example, revision component 224 may accept one or more keywords as inputs and may search on-device index 226 and/or ARC index 256 for a matching name, command and/or metadata. In some embodiments, actions and action recipes may be separately searchable to generate a desired set of search results. Actions and/or action recipes that have been defined by the user performing the search may be prioritized in the search results, avoiding the expenditure of computing time and resources that would otherwise be necessary to generate search results less likely to be relevant.

In some embodiments, action and/or action recipe metadata can facilitate efficient searching. For example, metadata tags can be generated to facilitate filtering and searching actions and/or action recipes based on keywords or subjects. By way of nonlimiting example, for an action that returns temperature (e.g., detecting room temperature using NEST), the corresponding action and/or action recipe can be tagged "hot" and/or "cold," and the like. Metadata tags can be generated in various ways. For example, one or more tagging rules can be applied to actions and/or action recipes based on the action/recipe name, associated commands, application involved, an input or output parameter, and the like. By way of nonlimiting example, searching for "action recipes that involve heat management" might return a list of action recipes that were tagged with a synonym or related term for heat management (e.g., "heat," "cold," freezing," etc.). As such, a user interface can be provided to permit searches that include metadata.

Additionally and/or alternatively, revision component 224 provides a user interface that facilitates editing actions and/or action recipes. A user interface may permit a user to select one or more existing actions and/or action recipes (e.g., using a touch command, a voice command, or otherwise) and prompt the user to make related changes. By way of nonlimiting example, revision component 224 may prompt or otherwise permit a user to edit an action, for example, by adding, modifying or deleting one or more of a set of recorded inputs, designated contextual input parameters, associated commands, action name, an associated application and the like. Additionally and/or alternatively, revision component 224 may prompt or otherwise permit a user to edit an action recipe, for example, by adding, modifying or deleting one or more of a set of recorded inputs, designated contextual input parameters, associated commands, action recipe name, associated applications, order of actions within the recipe, data passing parameters, alternative applications for a designated function, a priority order for alternative applications, assigned applications for a bound function, and the like. Various user interfaces can be implemented, as would be understood by those of ordinary skill in the art.

In the embodiment depicted in FIG. 2, environment 200 includes action cloud server 250. Generally, action cloud server 250 provides a service that aggregates actions, action recipes and commands, performs matchmaking for received commands, and/or delivers matched actions (e.g., action datasets) and/or action recipes (e.g., action recipe datasets) to requesting users. In various embodiments, action cloud server 250 supports one or more API's that permit creator device 210 and/or consumer device 230 to interact with the platform. In the embodiment depicted in FIG. 2, action cloud server 250 includes action, recipe, and command ("ARC") aggregator 252, cloud command matching component 254, ARC index 256 and ARC data store 258.

ARC aggregator 252 generally receives recorded actions (e.g., action datasets) and/or action recipes (e.g., action recipe datasets) from submissions, for example, from creator device 210. Upon receipt, ARC aggregator 252 registers the actions and/or action recipes, for example, by indexing the action and/or action recipe (e.g., action and/or action dataset) in ARC index 256 and/or storing the action and/or action recipe in ARC data store 258. Although ARC data store 258 is depicted as one component, ARC data store 258 may be implemented across any number of components, whether distributed or otherwise. In some embodiments, submissions may be validated and audited. Accordingly, information about the action, action recipe and/or associated commands may be recorded (e.g., creator, private/shared, date, deviceID, action details, command details, version information, etc.) for reference. This and other information can be included in ARC index 256 for searching and/or matchmaking purposes.

In some embodiments, ARC aggregator 252 merges overlapping actions submitted by multiple users, so actions can be uniquely identified by command, user, or otherwise. Likewise, ARC aggregator 252 can merge overlapping action recipes submitted by multiple users, so actions can be uniquely identified by command, user, or otherwise. Additionally and/or alternatively, ARC aggregator 252 can merge commands to improve command matchmaking. In some embodiments, ARC aggregator 252 can create command templates using knowledge of which command elements are command parameters to facilitate merging. As such, ARC aggregator 252 can expand the body of known actions, action recipes and commands available for crowdsourcing, permitting a digital assistant application on a user device to incrementally increase supported functionality over time. In this manner, action cloud server 250 can evolve over time, as the body of actions, recipes and commands expands.

Cloud command matchmaking component 254 generally performs matchmaking based on received command inputs to locate potentially matching actions and/or action recipes. For example, if a user of consumer device 230 inputs a command that is not recognized (e.g., because there are no matching commands in data store 242), the user's device command matchmaking 236 can send the command (e.g., a textual representation thereof) to action cloud server 250 to check the crowdsourced database, ARC data store 258 and/or crowdsourced index, ARC index 256. Cloud command matchmaking component 254 can facilitate filtering by action and/or action recipe name, application, category, metadata, and the like. If a match is located, the corresponding action and/or action recipe can be accessed and transferred to the requesting device. As such, cloud command matchmaking component 254 can access a received command and search ARC index 256 for a matching stored command in ARC data store 258. In some embodiments, matchmaking can be enhanced in various ways, such as fuzzy matching and machine learning models, as would be understood by those of ordinary skill in the art. Thus, as the body of actions, recipes and commands expands over time, cloud command matchmaking component 254 can support new commands.

In some embodiments, action cloud sever 250 may include or otherwise make use of various tools for validating and managing actions and commands. For example, some tools may facilitate validation, review and flagging of actions and commands. In some embodiments, action cloud sever 250 includes manual override tools that facilitate review, validate or flag actions and commands, for example, by an administrator. In some embodiments, action cloud sever 250 includes semi-manual tools that process actions, action recipes and/or commands and flag specific cases for human review. Action cloud sever 250 may control access to the validation and management tools. For example, action cloud server 250 may control which devices are allowed to, or are flagged from, providing new actions and commands (e.g., using any type of authorization and/or authentication scheme). In some embodiments, action cloud sever 250 can automatically blacklist a specific action, action recipe and/or or command based on defined or learned rules, as would be understood by those of ordinary skill in the art. In any of these scenarios, action cloud sever 250 can update ARC index 256 and/or ARC data store 258 and raise corresponding alerts.

Figure 4:
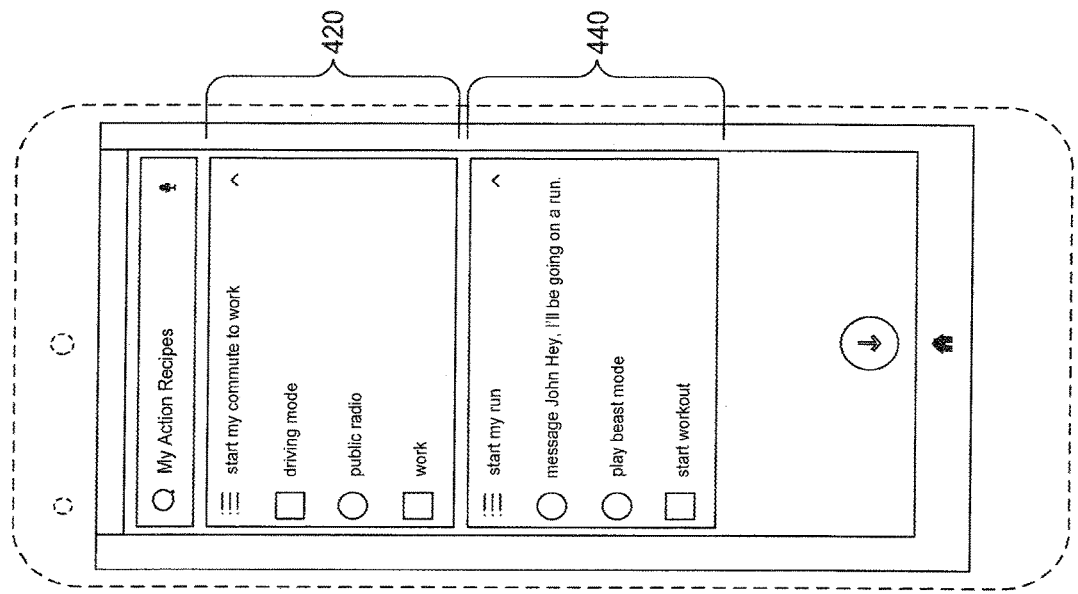
FIG. 4 is an example user interface with a list of action recipes, in accordance with embodiments of the present invention.
Figure 3:
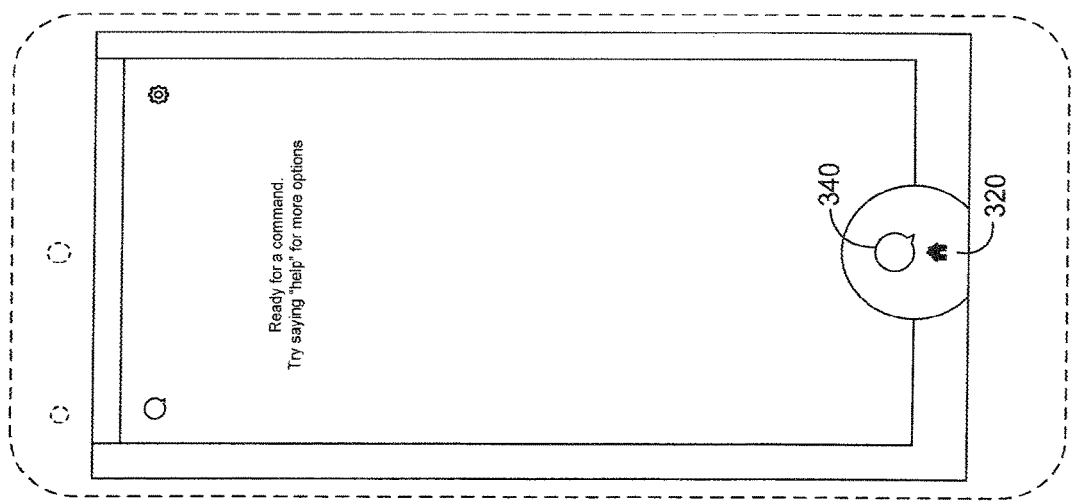
FIG. 3 is an example user interface depicting a command trigger, in accordance with embodiments of the present invention.

Turning now to FIGS. 3-5, FIGS. 3-5 depict a series of illustrations of an example user interface of a digital assistant application executing an action recipe, in accordance with embodiments of the present invention. Although each of FIGS. 3-5 depict example interfaces, other variations may be implemented within the present disclosure.

The user interface of FIG. 3 depicts an embodiment of a digital assistant application that utilizes a command trigger to listen for spoken commands. In this embodiment, home button 320 is assigned as the command trigger for the digital assistant application. As such, when a user presses and holds home button 320, a triggered listening mode is initiated. A visualization that the listening mode is active, such as speech box 340, may be provided. During this listening mode, the digital assistant application listens for and detects spoken commands. In some embodiments, a command trigger may be assigned to some other button or touch interface, or may be omitted instead. Other variations for detecting commands will be understood by those of ordinary skill in the art.

The user interface of FIG. 4 depicts a list of action recipes. For example, a digital assistant application might respond to the command "show my action recipes" by providing the user interface depicted in FIG. 4. In this example, the available action recipes (e.g., locally stored action recipe datasets) include action recipe 420 and action recipe 440. For example, action recipe 420 is named "start my commute to work," and includes three actions: "driving mode," "public radio," and "work." In this example, action recipe 420 disables calls and messages via the app TEXTDRIVE, starts a selected podcast on NPR, and begins navigation using GOOGLE MAPS. Action recipe 440 provides another example of an action recipe, in this case, consisting of three actions. First, action recipe 440 sends a text message to the contact "John" with the text "Hey, I'll be going on a run." Then, action recipe 440 starts playing the "beast mode" playlist on SPOTIFY, and finally, starts a stored navigation route through Central Park using GOOGLE MAPS. These action recipes are simply meant as examples, and various other action recipes will be understood by those of ordinary skill in the art. Users can create their own recipes made of different actions that are available on their device.

Figure 5B:
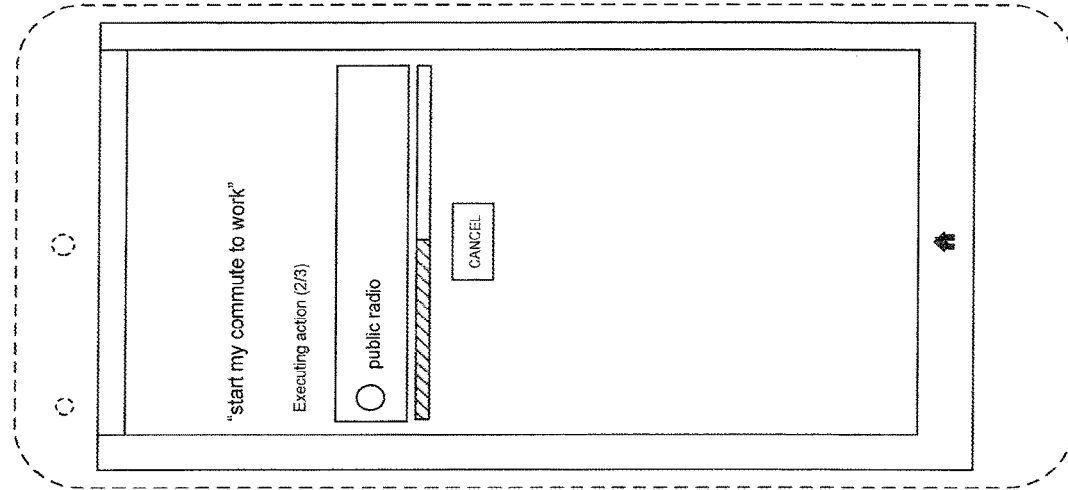
FIGS. 5A-5D are illustrations of an example user interface of a digital assistant application executing an action recipe, in accordance with embodiments of the present invention.
Figure 5A:
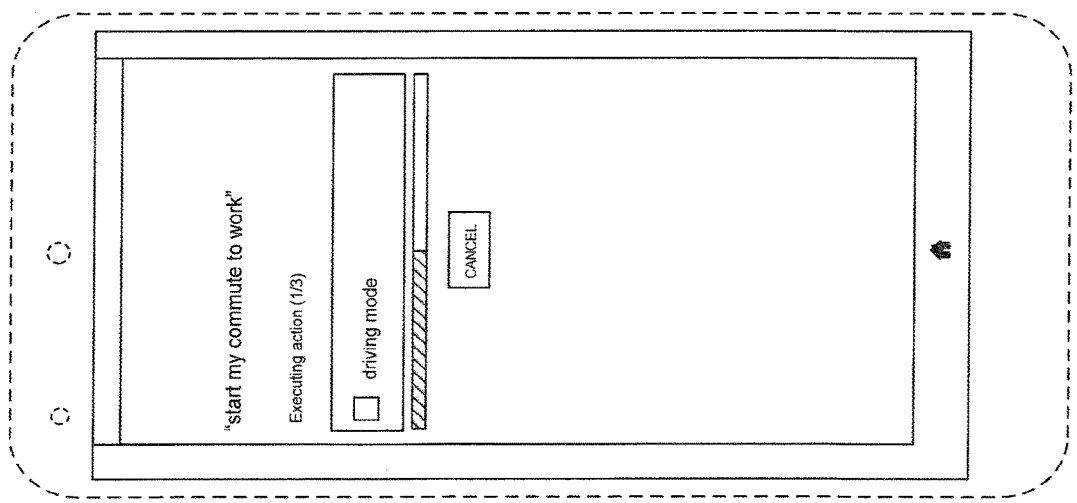
Figure 5D:
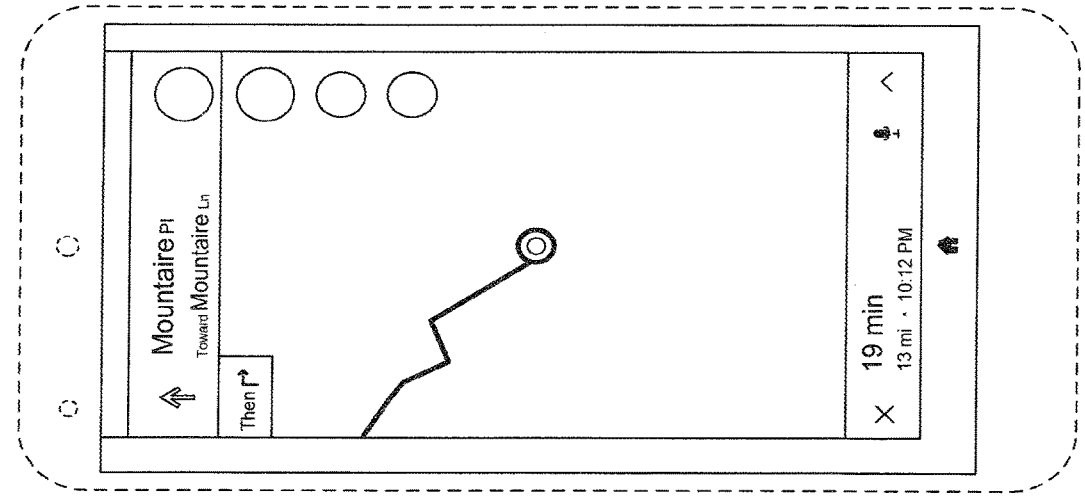
Figure 5C:
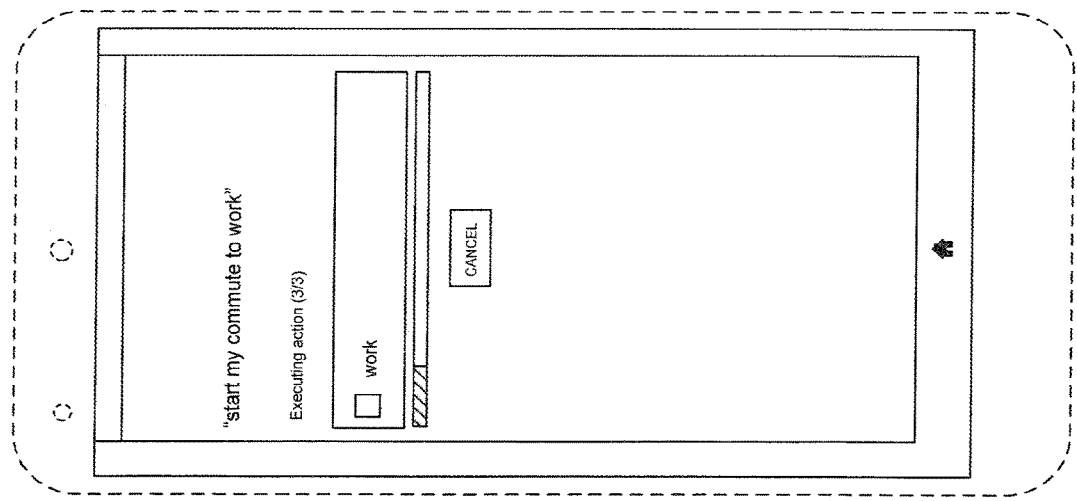

FIGS. 5A-5D depict a series of illustrations of a user interface of a digital assistant application executing action recipe 420 in FIG. 4. For example, a digital assistant application might respond to a selection of action recipe 420 by providing the user interface depicted in FIGS. 5A-5D. In this example, FIG. 5A illustrates the first action (driving mode) being executed, FIG. 5B illustrates the second action (public radio) being executed, and FIG. 5C illustrates the third action (work) being executed. In some embodiments, executing an action can take place in the background such that the invoked application being emulated is not displayed, although this need not be the case. During execution, any type of notification or indication of progress may be provided. Finally, FIG. 5D illustrates an example user interface once action recipe 420 has been executed. In this example, calls and messages have been disabled via the app TEXTDRIVE (not illustrated), the selected podcast has begun playing on NPR (not illustrated), and navigation has begun using GOOGLE MAPS. The user interfaces depicted in the foregoing figures are meant simply as examples. Other variations may be implemented within the present disclosure.

As such, actions and action recipes make life easier and faster, providing instant and customizable access to commonly used applications. Further, actions and action recipes provide a natural and simplified interface for users, without requiring users to remember specific actions or learn a new command syntax, reducing the cognitive load required for users to invoke actions and action recipes. Moreover, action recipes pipeline data from action to action, which facilitates automation, eliminates unnecessary user interactions, frees up computing resources, and improves computing efficiency. Finally, by emulating a set of inputs for a particular user, actions and action recipes leverage the user's existing accounts with third party applications. Accordingly, actions and action recipes can consolidate functionality across disparate systems without introducing any additional registration, authentication or authorization steps. As such, a user can efficiently and effectively perform multiple actions using a single command, whether within one application or multiple applications.

Exemplary Flow Diagrams

Figure 6:
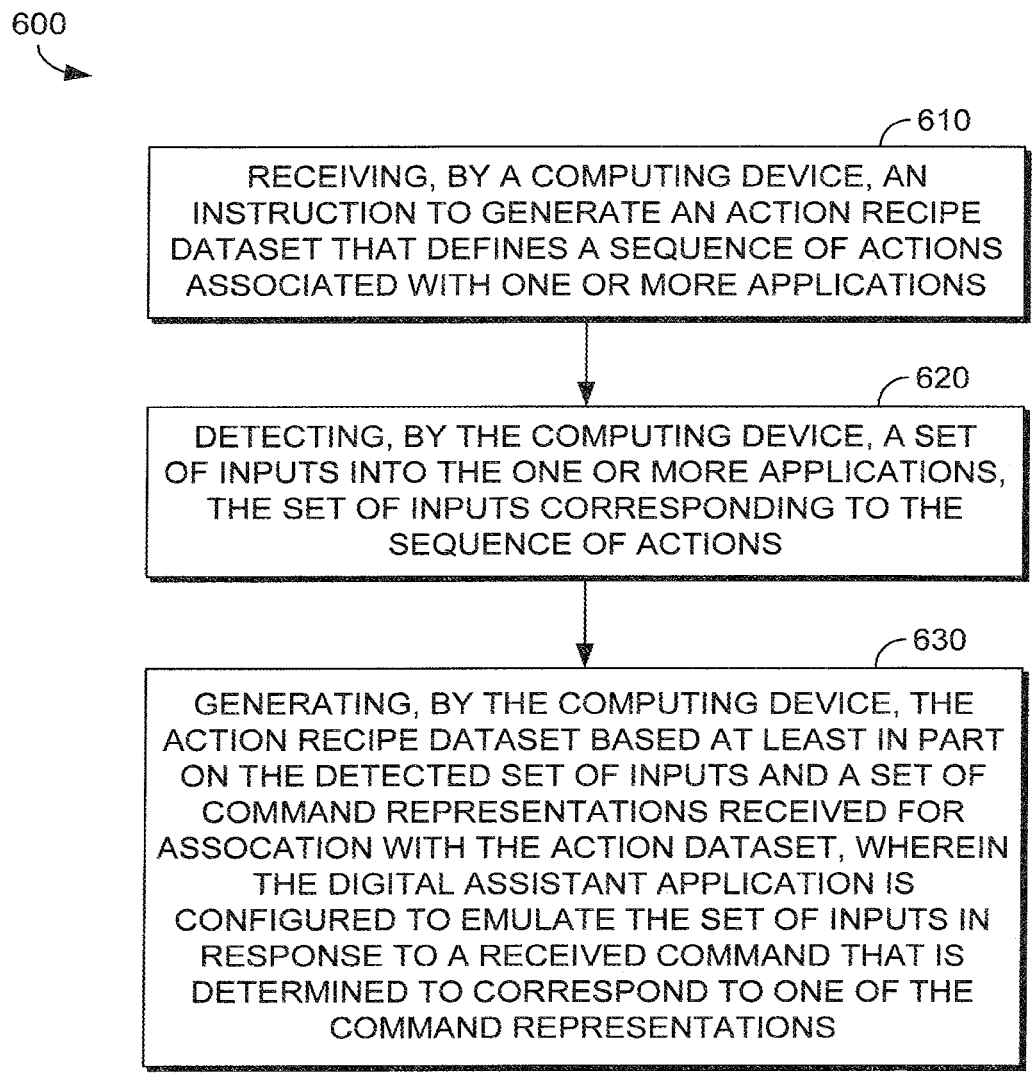
FIG. 6 is a flow diagram showing a method for defining action recipes with a digital assistant application, according to various embodiments of the present invention.
Figure 7:
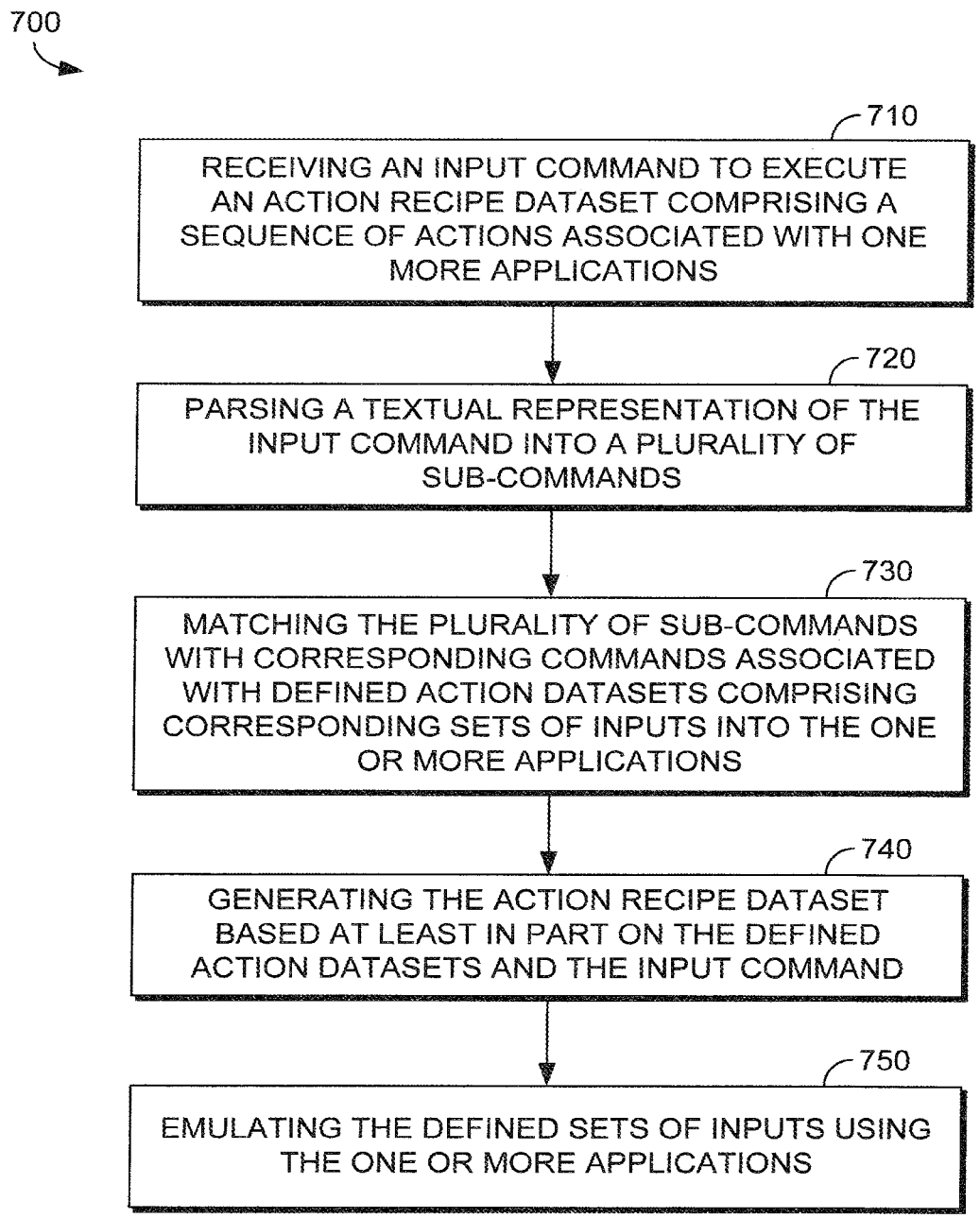
FIG. 7 is a flow diagram showing a method for defining action recipes with a digital assistant application, according to various embodiments of the present invention.

With reference now to FIGS. 6-7, flow diagrams are provided illustrating methods for defining action recipes with a digital assistant application. Each block of the methods 600 and 700 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 6, FIG. 6 illustrates a method 600 for defining action recipes with a digital assistant application, in accordance with embodiments described herein. Initially at block 610, an instruction is received to generate an action recipe dataset that defines a sequence of actions associated with one or more applications. At block 620, a set of inputs into the one or more applications is detected. The set of inputs correspond to the sequence of actions. At block 630, the action recipe dataset is generated based at least in part on the detected set of inputs and a set of command representations received for association with the action dataset. The digital assistant application is configured to emulate the set of inputs in response to a received command that is determined to correspond to one of the command representations.

Turning now to FIG. 7, FIG. 6 illustrates a method 700 for defining action recipes with a digital assistant application, in accordance with embodiments described herein. Initially at block 710, an input command to execute an action recipe dataset is received. The action recipe dataset comprises a sequence of actions associated with one or more applications. At block 720, a textual representation of the input command is parsed into a plurality of sub-commands. At block 730, the plurality of sub-commands is matched with corresponding commands associated with defined action datasets. The defined action datasets comprise corresponding sets of inputs into the one or more applications. At block 740, the action recipe dataset is generated based at least in part on the defined action datasets and the input command. At block 750, the defined sets of inputs are emulated using the one or more applications.

Exemplary Operating Environment

Figure 8:
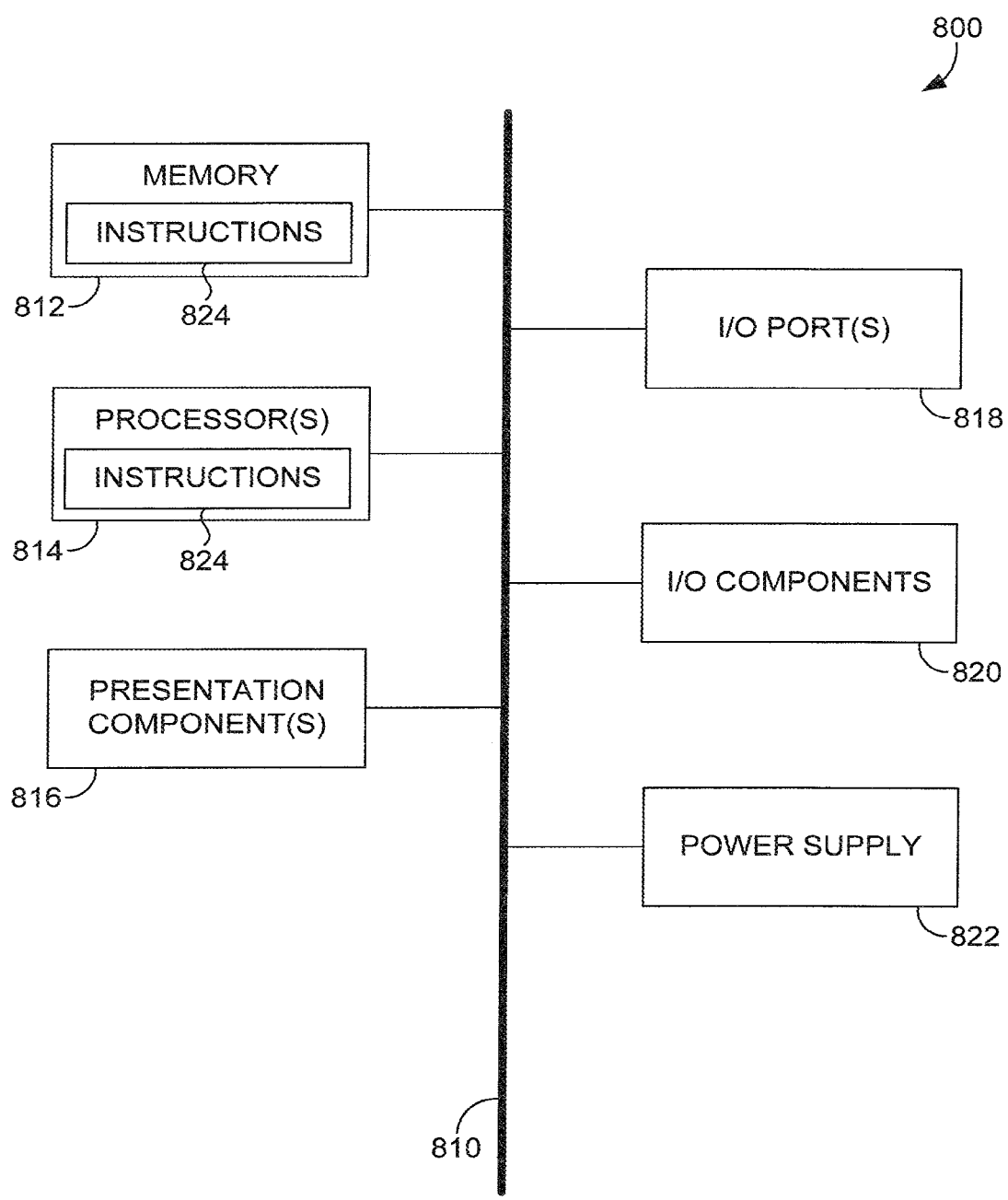
FIG. 8 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 800. Computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of computing device 800 to render immersive augmented reality or virtual reality.

Embodiments described herein support recording, executing and crowdsourcing action recipes. The components described herein refer to integrated components of a crowdsourced digital assistant system. The integrated components refer to the hardware architecture and software framework that support functionality using the crowdsourced digital assistant system. The hardware architecture refers to physical components and interrelationships thereof and the software framework refers to software providing functionality that can be implemented with hardware embodied on a device.

The end-to-end software-based crowdsourced digital assistant system can operate within the crowdsourced digital assistant system components to operate computer hardware to provide crowdsourced digital assistant system functionality. At a low level, hardware processors execute instructions selected from a machine language (also referred to as machine code or native) instruction set for a given processor.

The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the crowdsourced digital assistant system components can manage resources and provide services for the crowdsourced digital assistant system functionality. Any other variations and combinations thereof are contemplated with embodiments of the present invention.

Having identified various components in the present disclosure, it should be understood that any number components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for defining action recipes performed by a digital assistant application, the method comprising:

receiving, by a computing device, an instruction to generate an action recipe dataset that defines a sequence of actions associated with multiple applications;

detecting, by the computing device, a set of inputs into the multiple applications, wherein the set of inputs corresponds to the sequence of actions;

recording the detected set of inputs into the multiple applications; and generating, by the computing device, the action recipe dataset based on the recorded set of inputs, wherein the digital assistant application is configured to emulate the set of inputs in response to a received command, wherein the digital assistant application is configured to pass data from a first application of the multiple applications to a second, different, application of the multiple applications when emulating the set of inputs in response to the received command, wherein the digital assistant application is configured to provide the action recipe dataset to a remote server to facilitate distribution to multiple computing devices that each have the digital assistant application installed thereon, and wherein the received command instructs the digital assistant application to:

utilize a representation of an output of the first application as a value of a variable input parameter in an input command to the second application when emulating the set of inputs in response to the received command, apply a transformation to the output of the first application to generate transformed data, and pass the transformed data as the value of the variable input parameter in the input command to the second application.

2. The computer-implemented method of claim 1, wherein the digital assistant application is configured to pass the representation of the output from the first application as the value of the variable input parameter in the input command to the second application.

3. The computer-implemented method of claim 1, wherein the action recipe dataset is configured to bind a first action of the sequence of actions to a particular function.

4. The computer-implemented method of claim 3, wherein the digital assistant application is configured to emulate the first action by performing the function using an application selected from alternative applications.

5. The computer-implemented method of claim 1, wherein the action recipe dataset is configured to dynamically replace an application.

6. The computer-implemented method of claim 1, wherein the action recipe dataset is configured to pass data between actions of the sequence of actions.

7. The computer-implemented method of claim 1, wherein the received command includes a second value of a second variable input parameter of an input into one of the multiple applications.

8. The non-transitory computer-readable medium of claim 1, wherein the action recipe dataset is configured to dynamically replace an application.

9. The non-transitory computer-readable medium of claim 1, wherein the action recipe dataset is configured to pass data between actions of the sequence of actions.

10. The non-transitory computer-readable medium of claim 1, wherein the received command includes a second value of a second input parameter of an input into one of the multiple applications.

11. A non-transitory computer-readable medium whose contents, when executed by a computing device, cause the computing device to perform a method for defining action recipes performed by a digital assistant application, the method comprising:
receiving an instruction to generate an action recipe dataset that defines a sequence of actions associated with multiple applications;
detecting a set of inputs into the multiple applications, wherein the set of inputs corresponds to the sequence of actions;
recording the detected set of inputs into the multiple applications; and
generating the action recipe dataset based on the recorded set of inputs,
wherein the digital assistant application is configured to emulate the set of inputs in response to a received command,
wherein the digital assistant application is configured to pass data from a first application of the multiple applications to a second, different, application of the multiple applications when emulating the set of inputs in response to the received command,
wherein the digital assistant application is configured to provide the action recipe dataset to a remote server to facilitate distribution to multiple computing devices that each have the digital assistant application installed thereon, and
wherein the received command instructs the digital assistant application to:
utilize a representation of an output of the first application as a value of a variable input parameter in an input command to the second application when emulating the set of inputs in response to the received command,
apply a transformation to the output of the first application to generate transformed data, and
pass the transformed data as the value of the variable input parameter in the input command to the second application.

12. The non-transitory computer-readable medium of claim 11, wherein the digital assistant application is configured to pass the representation of the output from the first application as the value of the input parameter in the input command to the second application.

13. The non-transitory computer-readable medium of claim 11, wherein the action recipe dataset is configured to bind a first action of the sequence of actions to a particular function.

14. The non-transitory computer-readable medium of claim 13, wherein the digital assistant application is configured to emulate the first action by performing the function using an application selected from alternative applications.

* * * * *